April 4, 1967  J. S. HADDOCK  3,312,418
FISHING LINE APPLICATOR

Filed April 23, 1964  3 Sheets-Sheet 1

INVENTOR.
JOHN S. HADDOCK
BY
Head & Johnson
ATTORNEYS

April 4, 1967   J. S. HADDOCK   3,312,418
FISHING LINE APPLICATOR
Filed April 23, 1964   3 Sheets-Sheet 3

INVENTOR.
JOHN S. HADDOCK
BY
Head & Johnson
ATTORNEYS

United States Patent Office 3,312,418
Patented Apr. 4, 1967

3,312,418
FISHING LINE APPLICATOR
John S. Haddock, 2646 E. 34th St., Tulsa, Okla. 74129
Filed Apr. 23, 1964, Ser. No. 362,123
6 Claims. (Cl. 242—85)

This invention relates to apparatus for applying line onto fishing reels. More particularly this invention relates to an apparatus for applying fishing line to spinning reels of the type wherein the reel has an axis substantially parallel to the fishing rod and wherein the reel is ordinarily stationary in the fishing operation.

The monofilament line typically used with such spinning reels presents many problems in the loading onto the reel. It is important that the line be placed upon the reel spool without twisting, otherwise when cast, the line can become tangled very easily, resulting in what is known as a "birdnest" which is difficult if not impossible to remove. Very often fishermen will inadvertently place the line upon the stationary spinning reel in such a manner as to actually twist the line as it goes on the spool. As a result many fishing line manufacturers recommend that the spiral of the new line spool be transferred directly to the reel spool without any additional twist or turning. To the average fisherman this presents many problems. First of all, figuring out the manner in which the line should be transferred is not always easy to determine. Sometimes a double twist can be put in the line if not correctly handled. Secondly, many fishermen now buy pre-wound spools to keep away from such line transfer problems.

In many retail outlets spinning reel spools are loaded from bulk spools by placing the reel spool upon an arbor connected to a motor or a hand crank, wherein the axis of the reel spool is parallel to the axis of the bulk line spool. Such application invariably places the line on the spool unevenly during transfer as it must be guided by hand which is time consuming and inconvenient. Also the reel spool has to be removed from the reel.

Accordingly it is an object of this invention to provide an apparatus for applying line to spinning reels or the like which will overcome the problems heretofore encountered in transferring such line from a bulk spool to the reel.

It is another object of this invention to provide an apparatus which can be readily mounted directly to the spinning reel and which will hold the line in a proper position and attitude for being fed onto most of said spinning reels in common usage today.

A still further object of this invention is to provide an apparatus for supporting a large bulk spool of fishing line and which can be readily connected to the revolving pickup cylinder of most spinning reels in use today such that the fishing line will properly be fed therefrom onto the reel and so as to prevent twisting of the line during the transfer.

A still further object of this invention is to provide an apparatus which can be easily used and which operated conjointly with the revolving pickup cylinders used with most spinning reels and wherein said bulk spool will be adapted to rotate both about an axis perpendicular to the axis of the reel spool and rotate in a ratio of 1:1 about an axis parallel the axis of the reel so as to prevent twisting of the line during transfer.

These and other objects of this invention will become more evident from a study of the specification and claims when taken in conjunction with the following drawings which show but a preferred embodiment of the invention:

General description

Generally speaking, the line transfer applicator of this invention comprises at least one leg or extension member which is attachable at one end to the revolving pickup cylinder used with most spinning reels and extending forward thereof while the other end is adapted to retain a bulk spool the axis of which is typically transverse to the axis of the reel spool.

Detail description

Figure 1:
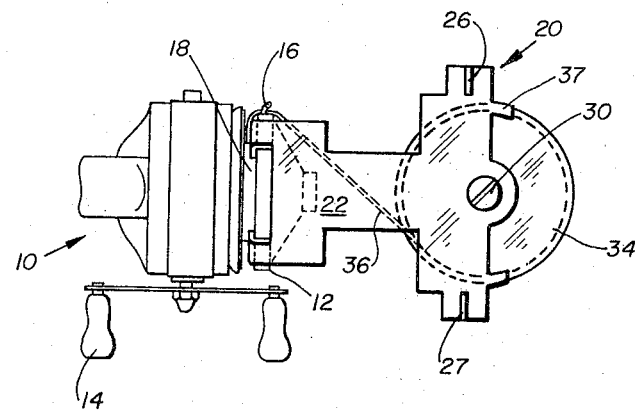
FIGURES 1 and 2 are top and side elevational views respectively of the fishing line applicator device as used in conjunction with a normally closed face type of spinning reel.
Figure 2:
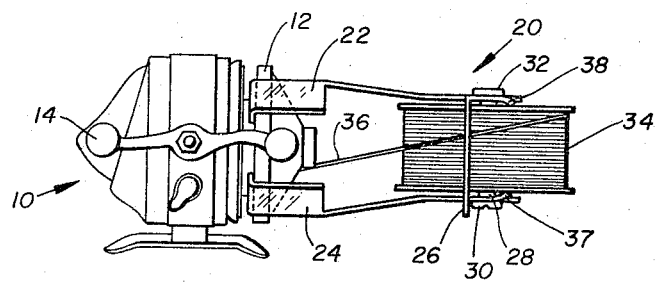

Referring now to the drawings, specifically FIGURES 1 and 2, numeral 10 indicates generally a spinning reel of the type normally referred to as a closed face type, such as that manufactured under the trademark "ZEBCO." In these views the cover normally closing the reel spool has been removed for use with the applicator of this invention. Removing the closure face exposes a revolving pickup cylinder 12 which is normally rotated about an axis substantially parallel to a fishing rod to which the reel is attached, and not shown herein, by rotation of reel crank 14. Attached to the revolving pickup cylinder 12 is a fishing line pickup guide pin 16 which changes the direction of the line as it is drawn onto a stationary spool 18. In these views, the fishing line adapter 20 includes a frame having substantially parallel spaced first and second arms 22 and 24 which in this embodiment are arranged in a circular outline around the axis of the pickup cylinder 12 and preferably normally spring biased inwardly towards each other whereby the adapter may be readily clamped about the revolving pickup cylinder 12. In some instances upper and lower cross bracing 26 and 27 may be provided to interconnect the two arms for desired rigidity. At the outward end of said arms 22 and 24 is shaft 28 which is held thereto by suitable fastening devices 30 and 32. A new line spool 34 is attached about shaft 28 which is generally perpendicular to the axis of said pickup cylinder and substantially within an extension of the circular outline of arms 22 and 24 and retained thereto by fasteners 30 and 32. In one embodiment, line spool braking elements 37 and 38 apply frictional drag of very small magnitude to the line spool 34.

In the operation of the embodiment shown in FIGURES 1 and 2, the new line spool 34 is affixed to the adaptor arms 22 and 24 so as to be free to rotate. The arms 22 and 24 are then clamped about or attached to the revolving pickup cylinder 12 as shown. The new fishing line is passed around line pickup guide pin 16 and attached to the reel spool 18. Thereafter by rotating reel crank 14 it will be noted that the adapter 20 will rotate therewith while line 36 passes off rotating spool 34 until the reel spool 18 is filled or the desired amount of line is applied.

Figure 3:
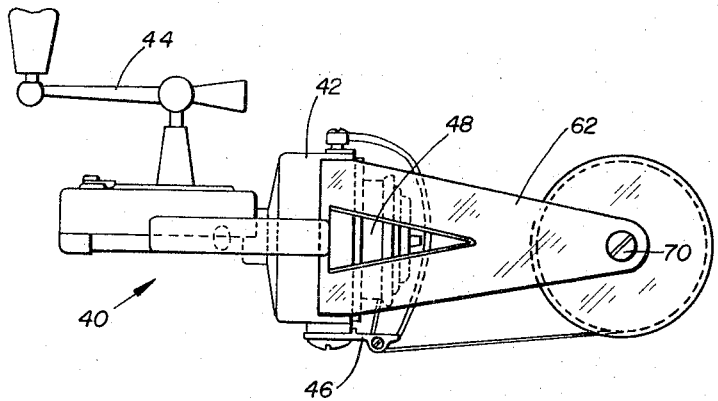
FIGURES 3 and 4 depict a modification of this invention, which are top and side elevational views respectively as used with a spinning reel of the normally open face type.
Figure 4:
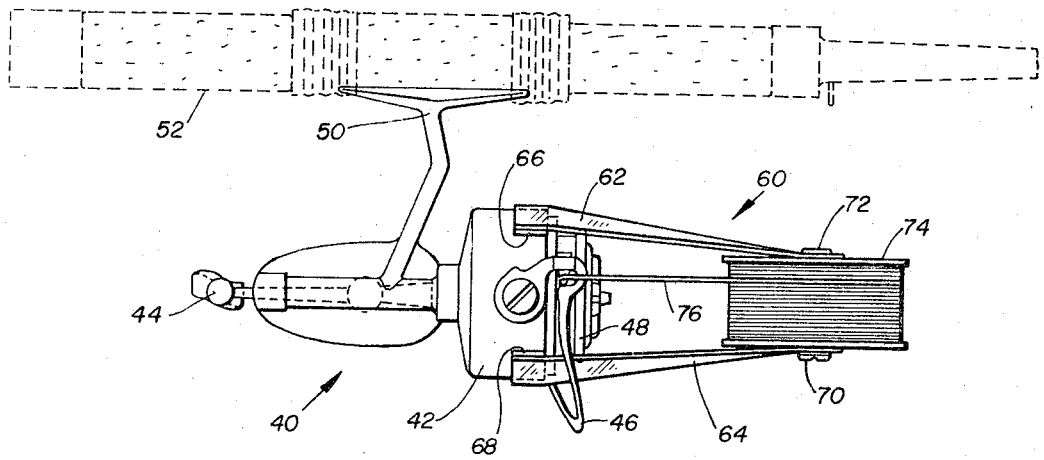

Referring now to the embodiment shown in FIGURES 3 and 4, the principle of this invention is shown applicable to an open face type spinning reel generally designated by the numeral 40. As with most spinning reels, the reel includes a revolving pickup cylinder 42 which is rotated through appropriate mechanism by reel crank 44. Attached to the revolving pickup cylinder is a fishing line pickup bale and line guide 46 which bales up the line and guides it to the stationary spool by revolving around the stationary reel spool 48. A shank and reel-foot portion 50 permits reel to be attached to a fishing rod 52 shown in dotted lines. The attachment forming the invention as shown in these views is generally designated by the numeral 60 and includes a first leg portion 62 and a second leg portion 64. At the outer ends thereof are pressure-sensitive adhesive portions 66 and 68 respectively for attachment to the revolving pickup cylinder 42 as shown. At the other end of the first and second leg portions are axial connectors 70 and 72 retaining a new line spool 74 therebetween.

The operation of the device shown in FIGURES 3 and 4 is substantially the same as that for the embodiment shown in FIGURES 1 and 2. That is, by attaching the pressure-sensitive adhesive ends 66 and 68 of the first and second leg portions 62 and 64 respectively to the revolving pickup cylinder, substantially as shown. One end of the line 76 is passed about the line pickup bale and line guide 46 and onto the reel spool 48. Rotating reel crank 44 causes the attachment 60 and the new line spool 74 to rotate not only about its axis which is transverse to the axis of the reel, but also rotate axially with the axis of the reel and hence eliminate twist in the fishing line as it is wrapped about reel spool 48. In some instances the embodiment of FIGURES 3 and 4 is purchased with new line bulk spools for ready use by the fisherman, and disposable therewith.

Figure 5:
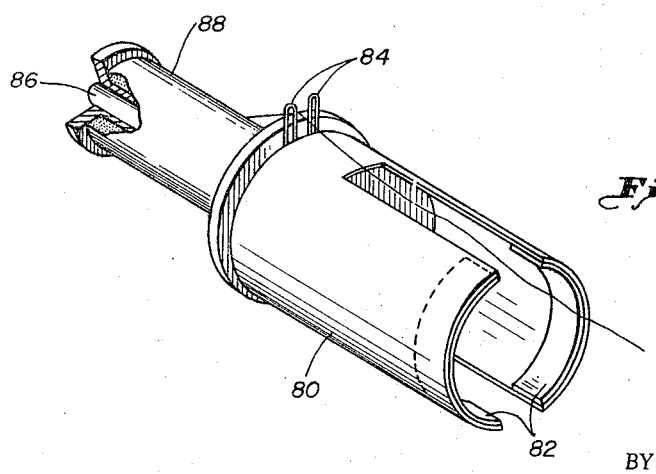
FIGURE 5 is an alternate embodiment of this invention depicting apparatus for transferring fishing line onto spinning reels from a bulk line spool.

The embodiment of FIGURE 5 is an alternate embodiment of this invention. A flexible cylindrical adapter portion 80 includes pressure-sensitive adhesive portions 82 at one end. Appropriate fishing line guides 84 extend upwardly, as shown. A shaft 86 extends axially outward from the cylindrical adapter 80 in order to receive a bulk line type of spool 88.

In use, the bulk line spool 88 slipped over shaft 86. Cylindrical adapter 80 is then attached to the revolving pickup cylinder such as designated as 12 in FIGURES 1 and 2 or 42 in FIGURES 3 and 4 and operated in the same manner therewith.

Figure 6:
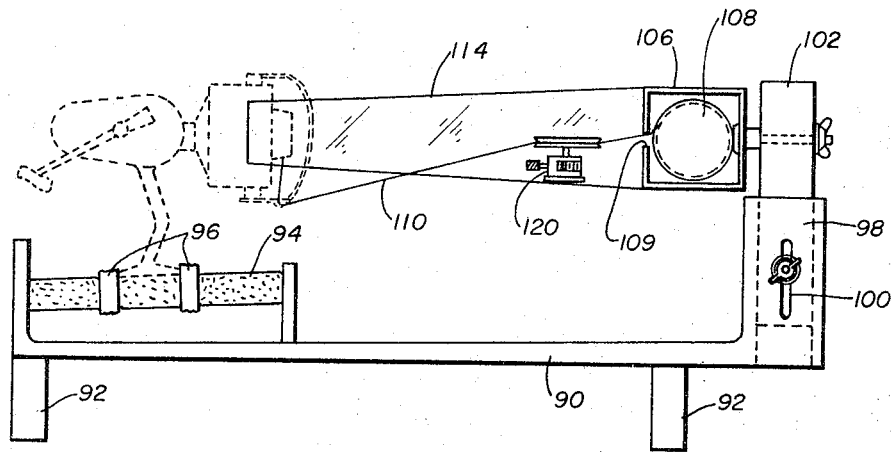
FIGURES 6 and 7 are side and top elevational views, respectively, of an alternate embodiment of this invention for transferring fishing line from larger bulk spools onto spinning reels.
Figure 7:
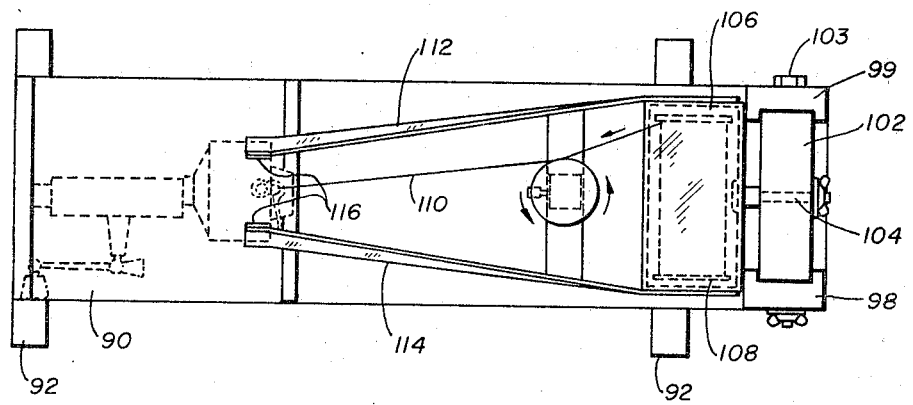

A yet further modification of this invention is depicted in FIGURES 6 and 7 of a device adaptable for use in retail stores, or the like, for transferring new line to spinning reels, from large new line bulk spools. The device includes a base portion 90 which may optionally have legs 92 for supporting same on a table or the like. At one end is a reel support 94 which includes a locking means 96 to support a fisherman's reel thereon for use. At the other ends are two upright members 98 having vertical slots 100 therein. A support block 102 is adapted for vertical movement within the upright members 98 to substantially align the axis of the reel spool with the axis of the bolt and shaft member 104, which is then retained with respect to the upright members 98 and 99 by bolt 102 which extends within the slot 100 through transverse openings so provided. In support block 102 an axial bolt and shaft member 104 is adapted in support block 102 to be substantially to the axis of the reel and is adapted to rotatingly support a yoke or new line spool container 106 such as that type manufactured under the trademark "Trilene" within which a bulk spool 108 is contained, the spool axis being transverse to the axis of the reel and rotatable thereabout. If a yoke is used, an axle will run from the yoke side to side to support the bulk spool as described, i.e., rotatably transverse to the axis of the reel. New line 110 passes from the spool to the reel spool. As shown with other apparatus of this invention the adapter includes first and second leg portions 112 and 114 respectively which are either permanently affixed or attachable at one end to the new line spool yoke or container 106 and to the revolving pickup cylinder at the other end by means of pressure-sensitive adhesive portions 116 or other mechanical attaching means, such as clamps or the like. A yardage counter 120, a device well known in the art, is adaptable to the line 110 to measure the desired yardage during use of this embodiment. In use the operator turns the reel crank, rotating the revolving pickup cylinder, the leg portions and new line spool yoke or container about the axis of the pickup cylinder. The spool 108 also rotates about its axis as line feeds onto the reel spool.

Although the adapter of this invention can be manufactured of many and various materials, it is found that plastics or synthetic resins are readily adaptable for use therewith, as in the embodiments of FIGURES 3 through 7, whereas a metallic adapter is best suited for the type of FIGURES 1 and 2 where the two leg portions are spring biased toward each other.

In some instances only one leg portion is suitable provided sufficient means for attachment to the revolving pickup cylinder is provided.

As used herein, the term "bulk line spool" is considered generic to spools of relatively small line yardage, i.e., 25, 50 or 100 yards, as well as those of greater line yardage.

This invention has been described with reference to specific and preferred embodiment. It will be apparent, however, that any modifications can be made without departing from the spirit and the scope of the invention as limited by the appended claims.

What is claimed is:

1. A device for transferring fishing line from a bulk spool onto a stationary spinning reel spool of the type using a pickup cylinder revolvable co-axially about said spool comprising:
   a horizontal base;
   means at one end of said base to support a spinning reel to face towards the other end;
   a vertically adjustable support member at the said other end;
   a yoke member open towards said one end, means rotatably supporting said yoke member on said support member, means on said yoke member adapted to rotatably receive said bulk spool such that the axis of said bulk spool is transverse to the axis of said pickup cylinder;
   flexible means extensible from said yoke towards said pickup cylinder, and attachable thereto whereby said yoke is revolvable as said pickup cylinder revolves and whereby said bulk spool is rotatable simultaneous therewith about its said transverse axis.

2. A device according to claim 1 including a yardage counter for said line.

3. A device for transferring line from a bulk spool onto a stationary spinning reel spool of the type using a pickup cylinder revolvable coaxially about said spool comprising:
   a frame;
   a plurality of arm means longitudinally extending in one direction from said frame and having arcuate terminal ends arranged in a circular outline around a first axis for attachment to said pickup cylinder for rotation therewith;
   said frame carrying a shaft for said bulk spool, said shaft being generally perpendicular to said first axis and substantially within an extension of said circular outline along said first axis.

4. A device according to claim 3 wherein said arm means are attachable to said pickup cylinder by means of pressure-sensitive adhesive means.

5. A device according to claim 3 wherein said arm means are spring biased toward each other for clamping attachment to said pickup cylinder.

6. A device according to claim 3 wherein said shaft for said bulk spool is co-axial with an extension of said first axis.

(References on following page)

References Cited by the Examiner

UNITED STATES PATENTS

| | | | |
|---|---|---|---|
| 1,189,415 | 7/1916 | Wilcox | 242—136 |
| 1,656,464 | 1/1928 | Auren | 242—136 |
| 2,147,216 | 2/1939 | Raasch | 242—129.6 |
| 2,371,109 | 3/1945 | Sanford | 242—55.2 |
| 2,459,963 | 1/1949 | Roark | 242—85 |
| 3,136,066 | 6/1964 | Spinn | 242—84.1 X |

FRANK J. COHEN, *Primary Examiner.*

MERVIN STEIN, *Examiner.*

B. S. TAYLOR, *Assistant Examiner.*